MOTOR WITH GYRATING ROTOR

Original Filed Oct. 21, 1966 2 Sheets-Sheet 1

INVENTOR.
ELVIN C. WELCH
BY
Elliott & Pastoriza
ATTORNEYS

MOTOR WITH GYRATING ROTOR

Original Filed Oct. 21, 1966 2 Sheets-Sheet 2

INVENTOR.
ELVIN C. WELCH
BY
Elliott & Pastoriza
ATTORNEYS

United States Patent Office

Re. 27,446
Reissued Aug. 1, 1972

27,446

MOTOR WITH GYRATING ROTOR

Elvin C. Welch, 9905 W. Jefferson Blvd.,
Culver City, Calif. 90230

Original No. 3,452,227, dated June 24, 1969, Ser. No. 588,497, Oct. 21, 1966. Application for reissue June 7, 1971, Ser. No. 150,493
Int. Cl. H02k *37/00*
U.S. Cl. 310—49 10 Claims

Matter enclosed in heavy brackets [ ] appears in the original patent but forms no part of this reissue specification; matter printed in italics indicates the additions made by reissue.

ABSTRACT OF THE DISCLOSURE

[This disclosure relates to a new type of] *A* stepper motor [wherein there is provided] *having* a stator with a rotor eccentrically positioned in the stator for rolling movement about the interior of the stator such that the axis of the rotor revolves about the axis of the stator in one direction. An output shaft is provided with an output ring preferably having gear teeth and concentrically positioned within the stator with its periphery in engagement with the periphery of the gyrating rotor. The diameter of the rotor is intermediate the inside diameter of the stator and the diameter of the output shaft ring so that the output shaft ring will engage an inside surface of the rotor and will be caused to rotate upon gyrating movement of the rotor. The rotor itself is maintained in rolling engagement with the interior of the stator by the magnetic attraction or repulsion produced by suitable stator field windings and pole pieces which would function to provide a rotating magnetic field in the manner similar to conventional stepper motor stator fields. Gear teeth may be provided between the engaged rolling portions to prevent slippage. The relative diameters of the stator, rotor, and output shaft ring are adjusted to provide a desired incremental step or shaft rotation for a given degree of rotation of the stator field.

This invention relates generally to motors and more particularly to an improved motor incorporating a gyrating rotor.

While the principles of the invention are applicable to many types of motors including hydraulic as well as electrical motors, the preferred embodiment of the invention will be described with respect to an electric stepper motor wherein the novel features of the invention are particularly advantageous.

Conventional stepper motors include a stator structure incorporating suitable field windings for providing a magnetic field vector which may be caused to move successively to various circumferential spatial positions by proper sequential energization of the stator windings. By employing a rotor of magnetic material, the rotor will follow the magnetic field and thus move a discrete step for each step of the field vector. A suitable controlling means in the form of a logic circuit responsive to input pulses may be provided to effect the desired sequential energization of the stator field windings and thus cause a stepping of the rotor about its axis of rotation in accord with the input pulses received.

One of the major concerns of stepper motors of the foregoing type involves the moment of inertia of the rotor itself. In starting from one stepped position to the next stepped position, and in stopping in the next stepped position, the rotor inertia can interfere with accurate stepping movement, particularly when the stepping takes place at a high rate of speed. This inertia can cause the rotor to either fail to accomplish a stepped position or to overshoot or actually skip stepped positions. If the output shaft of the rotor operates in conjunction with other computer equipment where it is desired that the number of steps are exactly equal to a number of pulses, the entire computer can record false information if the rotor should miss or skip any particular step provided for in the input information.

Another important consideration is the desirability, in certain applications, of providing a stepper motor in which the output shaft angle rotation provided for each step can be readily adjusted, such as to a fairly small angle even though the field executes 90° steps. A small output shaft angle can be accomplished by providing several stator windings circumferentially distributed about the rotor and arranged to generate a magnetic field vector which steps through the desired small angle so that the rotor and its shaft will similarly step through the small angle. However, such an arrangement is low in efficiency since only a small fraction of the total windings available can be used at one time. There is also involved increased expense in providing the necessary number of windings. Further, the controller for interpreting input pulses to provide the desired stepping of the vector field is increased in complexity. An alternative method would be to provide a simple mechanical reduction gearing between the rotor and a suitable output shaft which would reduce the rotation of the output shaft to the desired small shaft angle step. This latter solution, however, increases the overall inertia of the device as a consequence of the reduction gears involved and also adds to the general bulk and expense of the stepper motor.

A third most important consideration in stepper motors in connection with the foregoing is the desirability of being able to effect an extremely large number of steps per unit time for a given stator field winding configuration and controller. For example, if a field winding stator configuration is such that the generated magnetic field vector is caused to spatially execute 90° steps, the rotor in the conventional type stepper motor will similarly execute 90° steps. If the desired number of steps per unit time is large, such as of the order of 4000 steps per second, it would be very difficult to rotatably mount the rotor for this rate of speed. And even if such could be accomplished, the rotor bearings would quickly wear out. It would be desirable to enable the output shaft to execute steps at an extremely rapid rate without requiring that the rotor and other components move at such high speeds and without having to make any changes in the magnetic field generating equipment or windings, all to the end that long life is assured and high magnetic efficiency is preserved.

With the foregoing considerations in mind, it is a primary object of this inventon to provide an improved motor which may be operated as a stepper motor wherein the foregoing problems inherent in present stepper motors are overcome.

More particularly, it is an object to provide an electric stepper motor wherein the inertia of the movement of the rotor is substantially reduced as compared to the inertia experienced by the rotors of presently available stepper motors all to the end that the stepper motor output shaft rotation can be stepped at an extremely rapid rate with negligible possibility of mis-steps as a consequence of high inertia.

Another important object is to provide an improved electric stepper motor in which the steping angle of the output shaft may be easily adjusted without having to alter a basic stator winding configuration and stator winding energy input for generating a magnetic field vector, or without the necessity of complicated gear reduction systems of the type that would normally be necessary if employed with conventional type stepper motors.

Another important object is to provide an improved electric stepper motor in which the actual steps of an output shaft may be effected at an extremely rapid rate without undue wear on bearings or other components of the system.

Still other objects of this invention are to provide an improved electric stepper motor is relatively economical to manufacture, long lived, is not bulky, and does not require expensive components and the like for realizing extremely accurate stepping action.

Briefly, these and many other objects and advantages of this invention are attained by providing a stator with a rotor eccentrically positioned in the stator for rolling *or orbiting* movement about the interior of the stator such that the axis of the rotor [revolves] *orbits* about the axis of the stator in one direction. The rotor itself, as a consequence of the rolling action about the inside of the stator, is caused to rotate about its own axis in an opposite direction. As a consequence of these contrary directions, the net moment of inertia of movement of the rotor to successive spatial positions about the interior surface of the stator is reduced substantially relative to the moment of inertia of the rotor if it were concentrically mounted in the stator for rotation.

The motor structure also contemplates the provision of an output shaft including an output ring preferably having gear teeth and concentrically positioned within the stator with its periphery in engagement with the periphery of the gyrating rotor. In the preferred embodiment, the diameter of the rotor is intermediate the inside diameter of the stator and the diameter of the output shaft ring so that the output shaft ring will engage an inside surface of the rotor and will be caused to rotate upon gyrating movement of the rotor. The rotor may be a hollow cylindrical sleeve over its complete length, or may be a solid cylinder except for shallow cup shaped indentations at each end which will provide the required inside surface. The rotor material may be either polarized magnetic material such as alnico, or non-polarized such as soft iron.

The rotor itself *is not structurally constrained in radial directions within the stator interior bore but rather* is maintained in rolling engagement with the interior of the stator by the magnetic attraction or repulsion produced by suitable stator field windings and pole pieces which function to provide a rotating magnetic field in a manner similar to conventional stepper motor stator fields. Slippage between the rolling surfaces may be prevented if desired by providing gear teeth on portions of the surfaces in actual contact. Either an odd or even number of stator poles may be employed with one or more poles excited simultaneously. By adjusting the relative diameters of the stator, rotor, and output shaft ring, a desired incremental step or shaft rotation can be provided for a given degree of rotation of the stator field. In this respect, the same arrangement of stator, rotor, and output shaft ring which functions to reduce substantially the moment of inertia of the rotor movement also functions as a gear reduction so that desired small angle steps of an output shaft can be achieved and an extremely rapid stepping rate can be achieved without unduly complicating the overall motor structure itself and without materially altering the desired low moment of inertia.

A better understanding of the invention will be had by now referring to the accompanying drawings in which.

Figure 1:
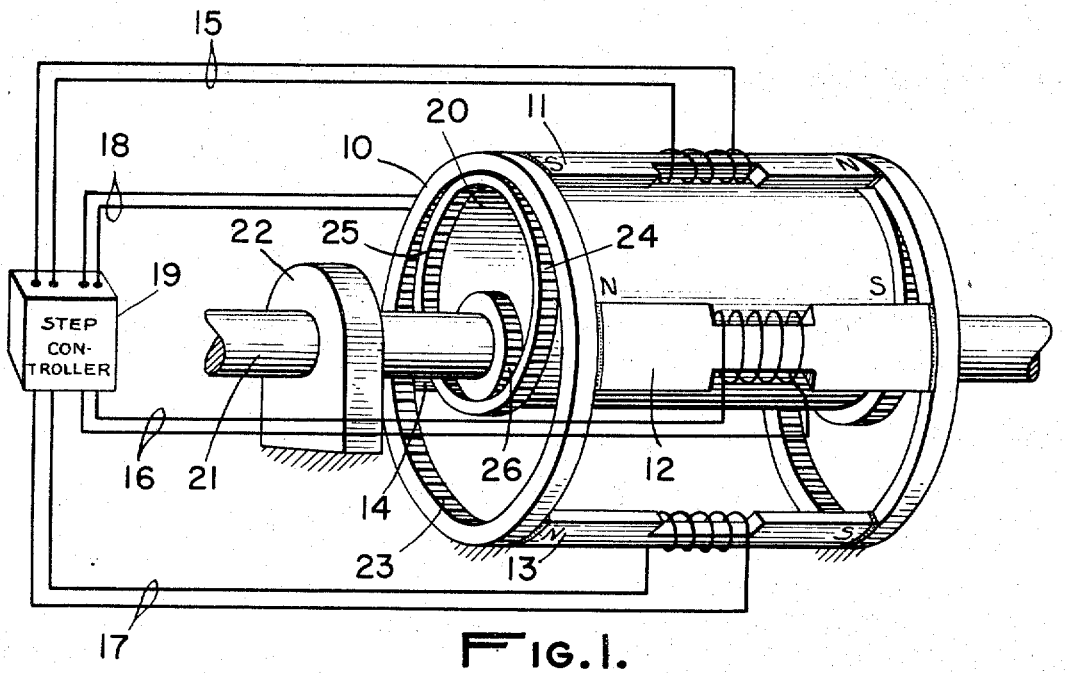
FIGURE 1 is a schematic perspective view illustrating a stator, rotor, output shaft, and other basic components making up an electric motor in accord with one embodiment of this invention.
Figure 2:
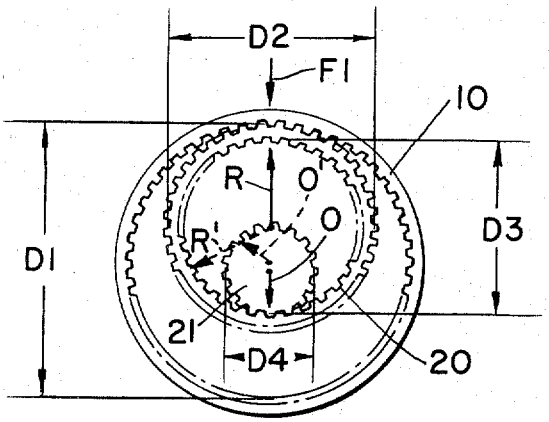
FIGURE 2 is a front elevational schematic view of the motor of FIGURE 1 illustrating the rotor and output shafts in first positions relative to the stator.
Figure 3:
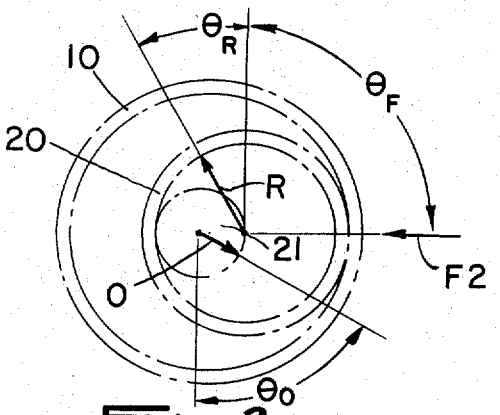
Figure 4:
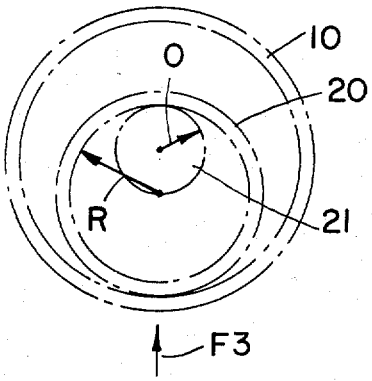
Figure 5:
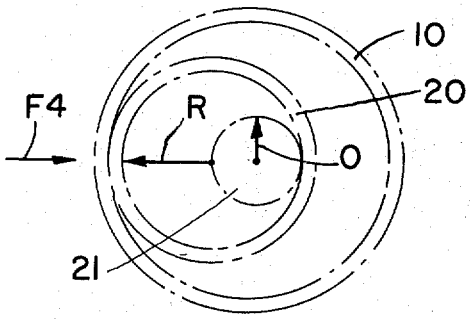
Figure 6:
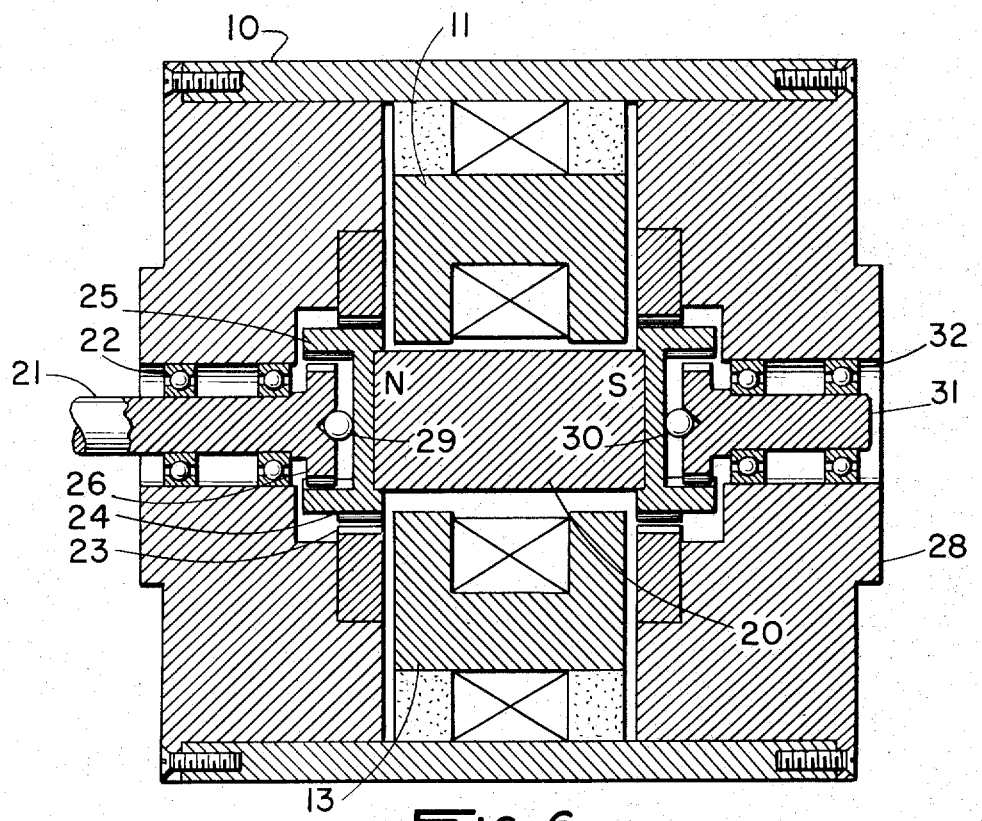
Figure 7:
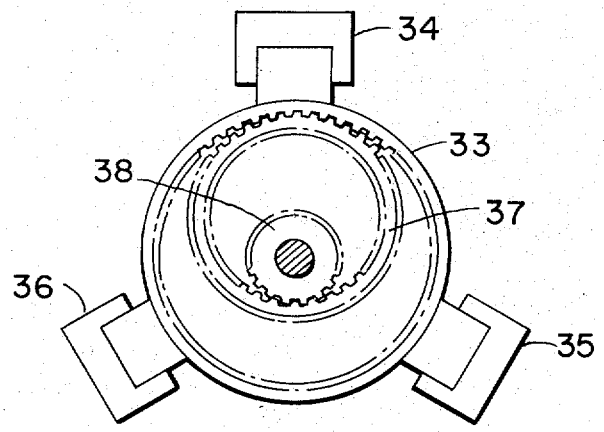

FIGURES 3, 4, and 5 are views similar to FIGURE 2 but illustrating the rotor and output shaft in successive positions during a stepping operation of the motor;

FIGURE 6 is a cross section of an actual embodiment of the structure illustrated schematically in FIGURE 1; and FIGURE 7 is a front schematic view of a modified embodiment of the invention.

Referring first to FIGURE 1 there is illustrated a stator structure 10, which in the example chosen for illustrative purposes, is the shape of a cylindrical body. Secured to the stator are suitable stator winding structures including pole pieces 11, 12, 13 and 14 spatially positioned successively at 90°. Each of the pole pieces includes windings having input conductors designated at 15, 16, 17, and 18, respectively. These input conductors connect to a step controller indicated schematically by the box 19.

The step controller may include suitable logic circuits responsive to a series of input pulses applied to clockwise and counterclockwise terminals which will effect a sequential stepping of the magnetic field about the rotor in a clockwise or counterclockwise direction. As a simple illustration, if the windings for the pole pieces 11, 12, 13, and 14 are sequentially energized one at a time, there will result a magnetic field vector which will assume successive spatial positions separated by 90° about the stator axis in a clockwise direction when viewed from the left end of FIGURE 1. If the various pole piece windings are energized in an opposite sequence such as 11, 14, 13, and 12, the magnetic field vector will be caused to rotate in 90° steps in an opposite direction about the stator.

Disposed within the stator structure 10 is a cylindrical rotor 20 made of magnetic material such that it will be attracted to the interior stator wall by the particular field pole piece whose winding is energized. This rotor structure defines in part a rotor ring which may constitute the actual portion engaging the interior bore of the stator 10.

In the preferred embodiment of the invention, the rotor constitutes a permanent magnet of given polaribation and diametrically opposite pole pieces are energized in an opposite sense simultaneously to increase the magnetic field. Thus, pole pieces 11 would exert an attractive force and pole piece 13 would simultaneously exert a repelling force. In the next step, pole piece 12 would exert an attractive force and pole piece 14 would simultaneously exert a repelling force. By this type of sequential energization, the magnetic efficiency is increased since one-half of the total windings are utilized rather than one-fourth.

Suitable controller circuits responsive to clockwise and counterclockwise input pulses for effecting the stepping of a magnetic field vector are illustrated in detail in my United States Patent No. 3,239,738.

At the front of the rotor 20 there is provided an output shaft structure 21 mounted along the axis A—A of the stator 10. This output shaft is mounted for rotation about this axis by suitable bearings such as indicated at 22. Actually, bearings are provided at both ends as will become clearer when an actual embodiment is described as opposed to the schematic showing in FIGURE 1.

It will be noted in FIGURE 1 that the interior wall of the stator 10 includes gear teeth 23 and for convenience in terminology, the cylindrical structure of the stator upon which the gear teeth are formed will be designated a stator ring. Similarly, the rotor 20 includes exterior gear teeth 24 and interior gear teeth 25 on a portion of the rotor which will hereafter be referred to as a rotor ring. Finally, the output shaft structure 21 includes an enlarged diameter portion upon which outer gear teeth 26 are provided and this portion supporting the gear teeth 26 will be referred to as an output ring.

The diameters of the stator ring, rotor ring, and output ring are such that the gear teeth 23 on the inside stator ring are in meshing engagement with the gear teeth 24 on the exterior of the rotor when the interior gear teeth 25 are in engagement with the exterior gear teeth 26 on the output shaft, the output shaft itself being maintained in a concentric or coaxial relationship with the axis A—A of the stator bore.

Referring now to FIGURES 2, 3, 4, and 5, the operation of the structure described in FIGURE 1 will be understood. Assume first that the step controller 19 of FIGURE 1 receives a series of clockwise input pulses and functions through its logic circuit to sequentially energize the various field windings in a clockwise direction. The successive spatial positions of the stator field vector are indicated schematically in FIGURES 2, 3, 4, and 5 by the vectors F1, F2, F3, and F4, respectively.

When the stator field is as represented by the vector F1, the rotor 20 will be in the position illustrated in FIGURE 2. For convenience in indicating the relative rotational positions of the rotor and the output shaft ring, the solid arrows R and O are drawn as shown. When the upper stator field winding is de-energized and the next successive field winding energized, the vector F1 is removed and the vector F2 illustrated in FIGURE 3 is generated. The rotor is thus magnetically attracted to the position illustrated in FIGURE 3 and this motion is effected by means of the rotor rolling about the interior arcuate wall of the stator 10 to the position shown in FIGURE 3. This rolling action of the rotor results in a rotation of the rotor about its own axis a certain number of degrees in a counterclockwise direction as viewed in FIGURES 2 and 3. Thus, the arrow R will assume the position illustrated in FIGURE 3 which is in a counterclockwise direction relative to its position in FIGURE 2. On the other hand, the axis of the rotor itself has revolved 90° about the axis of the stator as will also be evident from FIGURE 3. The output shaft ring 21 will also be rotated as a result of the rotation of the rotor so that the arrow $\beta$ will be repositioned as shown.

The next stepping of the stator field will result in the vector F3 being generated as illustrated in FIGURE 4 and this magnetic field will then cause the rotor 20 to roll to the position illustrated in FIGURE 4. This rolling action of the rotor will again result in a rotation of the rotor about its own axis in a counterclockwise direction while the geometrical center of the rotor itself revolves 90° about the center axis of the stator. Also the output shaft will be rotated to a new position as shown by the arrow O.

FIGURE 5 shows the next successive position of the rotor and output shaft upon energization of the field F4.

When the field F4 is de-energized and the field vector F1 again applied, the rotor will then be back into the position illustrated in FIGURE 2 insofar as its own axis is concerned. That is, when back in the position illustrated in FIGURE 2, the rotor axis has made one complete revolution about the center axis of the stator. However, the arrow R will now be in the position R′ indicated in dotted lines in FIGURE 2 and the arrow O on the output shaft will be in the position of the dotted line arrow O′ in FIGURE 2.

If the inside diameter of the stator is indicated D1 as shown in FIGURE 2, the outside diameter of the rotor D2, the inside diameter of the rotor D3, and the outside diameter of the shaft ring D4, the following relationships exist: The degree of rotation of the rotor about its own axis during revolving movement of its axis about the center axis of the stator, is given by:

$$\theta_R=\theta_F\left(1-\frac{D1}{D2}\right)$$

where $\theta_R$ equals the angle of rotation of the rotor 20 about its own axis; that is, the angle through which the arrow R moves from FIGURE 2 to FIGURE 3; and $\theta_F$ equals the angular movement of the field vector F1 to the position F2 which corresponds to the angular movement of the axis of the rotor about the axis of the stator.

Also, $$\theta_O=\theta_F\left(\frac{D1}{D2}\cdot\frac{D3}{D4}\right)$$

where $\theta_O$ equals the angle through which the output shaft 21 rotates.

By way of example, if the ratio of D1/D2 is four-thirds and the ratio of D3/D4 is five-fourths, then the output shaft angle $\theta_O$ is given by $$\theta_F\left(1-\frac{4}{3}\cdot\frac{5}{4}\right)=-\frac{2}{3}\theta_F$$

Thus, $\theta_O$ will always equal two-thirds of the angle $\theta_F$ through which the field vector has moved which, as stated, equals the angle through which the axis of the rotor has revolved about the center of the stator. The resulting negative sign simply indicates that the rotation of the output shaft is opposite in sense to the rotation of the field vector.

In the schematic drawings illustrated in FIGURES 2, 3, 4, and 5, the above proposed ratios of diameters are substantially depicted. The arrow O has thus rotated towards 240° as indicated by the dotted line O′ and the arrow R has rotated 120° in an opposite direction as indicated by the dashed line R′ in FIGURE 1.

It will be appreciated from the above, that if the outside rotor diameter D2 is equal to the inside stator diameter D1 there will be no rotational movement of the rotor since the rotor axis will be substantially coincident with the stator axis. However, if the rotor diameter D2 is slightly less than the inside stator diameter D1, there will be a very slight rotational movement of the rotor as the same rolls about the interior of the stator. This angular movement will be extremely small and as a result, the angular movement of the output ring, whose diameter would now be very close to the diameter D3 of the interior of the rotor would be correspondingly small. Further, it will be evident that by making the diameters close to each other as described there is actually very little movement of the rotor in its gyrating action and thus the execution of the steps by the rotor can be effected extremely rapidly with substantially no inertia problems.

With respect to the foregoing, the decreased inertia is a consequence of rotation of the rotor in an opposite sense to the motion of gyration. This action results in a subtraction of the moment of inertia of one from that of the other. Thus, if M represents the mass of the gyrating rotor, then the net moment of inertia I is given by:

$$I=3/2M\left(\frac{D1}{2}-\frac{D2}{2}\right)^2$$

It can be seen from the above equation that as D2 approaches D1, the net moment of inertia approaches zero.

Moreover, it will be appreciated that the shaft angle executed for each step or spatial repositioning of the field through 90° may be adjusted to any desired value in accord with Equation 2 by appropriately selecting the proper diameters for the stator, and inside and outside of the rotor ring.

The provision of the gear teeth assures a positive drive between the various engaging rings. Since the number of gear teeth on each ring is directly proportional to the diameter of the ring, the number of gear teeth may be substituted for the various diameters, respectively, and the above relationships will still be accurate.

As a speecific example of an actual embodiment of the invention, there may be provided 75 gear teeth on the inside of the stator, as represented by the gear teeth 23 in FIGURE 1, and 72 gear teeth on the external portion of the rotor. Under these conditions, as the rotor rolls through one complete gyration so that its axis revolves 360° about the stator axis, the rotor comes up three teeth short of its original position.

Therefore, from Equation 1, bearing in mind that the diameters are proportioned to the number of teeth, the angle $\theta_R$ is given by:

$$\theta_R = 360° \left(1 - \frac{75}{72}\right) = 15°$$

If it is assumed that the number of teeth on the inside of the rotor ring as indicated at 25 in FIGURE 1 is 48 teeth and the number of teeth on the outside of the shaft output ring as indicated at 26 is 45 teeth, then the angle through which the output shaft moves will be given by:

$$\theta_O = 360° \left[1 - \left(\frac{75}{72}\right)\left(\frac{48}{45}\right)\right] - 40°$$

FIGURE 6 illustrates in cross section a closer representation to the actual structure of the motor schematically depicted in FIGURE 1. In FIGURE 6, the components corresponding to FIGURE 1 have been provided with the same numerals. It will be noted that the stator housing structure 10 includes front and rear end caps 27 and 28. The front end cap serves to support the front bearings 22. In addition, the output shaft 21 and corresponding rotor gear ring 26 include a simple thrust ball bearing 29 bearing against the left end of the rotor 20.

A similar bearing structure is incorporated in the end cap 28 for the right hand end of the rotor structure wherein there is provided a similar ball bearing 30 for a shaft 31 carrying a similar gear ring for cooperation with inside gear teeth on the opposite end of the rotor. As shown, bearings corresponding to the bearings 22, are provided at 32 in the end cap 28. Essentially, the shaft 31 is simply an idler shaft but serves to stabilize the rotor structure in its gyrating action.

In the embodiment depicted in FIGURE 6, the rotor 20 constitutes a permanent magnet, preferably of alnico, and is shown in its up position wherein the pole piece 11 is energized to attract the magnetic rotor 20 and, as described heretofore, the opposite pole piece 13 is energized to repel the magnet 20 simultaneously. A particular advantage in employing a permanent magnet rotor resides in the provision of a desirable damping action thereby lessening any over-shoot effect of the rotor while in its motion. This damping results from the magnetic flux lines of the rotor magnet cutting the stator windings and producing a voltage in the stator windings which is opposite in sense to the voltage applied by the winding leads thereby providing a breaking or damping action on the rotor motion.

FIGURE 7 is a partially schematic front cross-sectional view of a modified motor wherein a stator housing 33 incorporates only three stator pole pieces 34, 35 and 36. A suitable gyrating rotor structure which may be in the form of a sleeve 37 provided with suitable gear teeth cooperates with an output gear ring structure 38 in the same manner as described with respect to the embodiment of FIGURE 1. In the embodiment of FIGURE 7, the three field windings may be sequentially energized to result in the axis of the rotor gyrating through 120° steps. In this embodiment, only one-third of the stator magnetic circuit is energized at any one time and in this respect, the magnetic efficiency is not as great as in the case of the four pole pieces provided in the stator field wherein diametrically opposite poles may be energized simultaneously in an opposite sense. However, FIGURE 7 represents the minimum number of stator pole pieces necessary to avoid any ambiguities in effecting a stepper action for the gyrating type motor under consideration.

The fundamental considerations in providing a stepper motor with three or many more stator pole pieces in accord with the present invention, are: First, the rotor must be isotropic about its own axis such that rotations about its own axis does not alter the forces or torques produced by the action of the stator on the rotor. In other words, it must be dynamically and electrically symmetrical about its own axis. Second, the rotor must be anisotropic for rotation of its axis about the stator axis. The stator may then utilize this anisotropic property to produce a torque or force on the rotor which is a function of the angular position of the rotor axis with respect to the stator.

From the foregoing description, it will thus be seen that there is provided a greatly improved motor structure particularly well suited for stepper operation wherein all of the objects set forth are fully realized.

Various changes that fall within the scope and spirit of this invention will occur to those skilled in the art. The motor is therefore not to be thought of as limited to the specific embodiments set forth merely for illustrative purposes.

What is claimed is:

1. An electric motor including, in combination: a stator means *having an interior bore*; a rotor means of magnetic material within said stator *means interior bore* means and eccentrically positioned for rolling motion about the interior *bore* of said stator means the axis of said rotor being parallel to and revolving about the center axis of said stator means *said rotor means being structurally unconstrained in radial directions within said stator means interior bore*; output means coupled to said rotor means for providing an output rotation constituting a function of the rotation of said rotor means about its own axis as a consequence of its rolling action about the interior *bore* of said stator means said roller means being isotropic about its own axis; and magnetic field generating means for generating a magnetic field flux path in the direction of the axis of said rotor means in a manner to assume successive spatial positions about said stator means with time whereby said rotor means is caused to roll about the interior of said stator means by said magnetic field, the direction of rotation of said rotor means being opposite to the direction of revolving of said axis of said rotor means about said center axis whereby the net moment of inertia of said rotor means is reduced substantially relative to the moment of inertia of said rotor means if concentrically mounted in said stator means for rotation.

2. A motor according to claim 1, in which said magnetic field generating means includes stator winding means circumferentially spatially positioned about said stator means; and a controller connected to said winding means for energizing the same in a given sequence to step said field through said successive spatial positions in response to input pulses whereby a stepper motor is provided.

*3. A motor comprising:*

*a stator means;*

*a rotor means disposed within said stator for orbiting about the stator axis within the interior of said stator means;*

*means for generating a force which acts on said rotor means to cause it to orbit about the axis of said stator within the interior of said stator means;*

*means maintaining said rotor means in engagement with said stator means interior as it orbits about the axis of said stator means;*

*output means to provide an output rotation in response to said rotor orbiting movement.*

*4. The motor of claim 3 wherein said means maintaining said rotor means in engagement with said sator means interior as it orbits about the axis of said sator means includes means creating force vectors acting on said rotor means to maintain said engagement throughout said orbiting movement.*

*5. The motor of claim 4 wherein said means creating force vectors causes said force vectors to shift about the axis of said stator means as said rotor means orbits.*

*6. The motor of claim 3 wherein said means creating said force vectors includes means creating a magnetic attraction vector between said rotor means and said stator means.*

*7. The motor of claim 6 wherein said means for creating a magnetic attraction vector also provides said force generated by said means causing said rotor to orbit about said stator means axis.*

*8. The motor of claim 7 further including means causing the line of action of said magnetic attraction vector to assume successive positions about the stator means axis as said rotor means orbits.*

*9. The motor of claim 3 wherein said output means includes an output gear concentric with said stator means and meshing said gear teeth formed on a position of said rotor means.*

*10. The motor of claim 3 wherein said means maintaining said rotor in engagement with said stator includes a rotor configuration wherein portions thereof are permanently magnetized.*

References Cited

The following references, cited by the Examiner, are of record in the patented file of this patent or the original patent.

UNITED STATES PATENTS

| | | | |
|---|---|---|---|
| 3,322,984 | 5/1967 | Anderson | 310—82 |
| 2,857,536 | 10/1958 | Light | 310—82 |
| 3,334,253 | 8/1967 | Hill | 310—82 |
| 2,761,107 | 8/1956 | Giertz | 310—82 |
| 2,561,890 | 7/1951 | Stoddard | 310—82 |
| 2,761.079 | 8/1956 | Hedstrom | 310—66 |
| 3,147,425 | 9/1964 | Christoff | 310—82 |
| 3,262,081 | 7/1966 | Fairbanks | 310—82 |
| 3,308,320 | 3/1967 | Spencer | 310—82 |

J D MILLER, Primary Examiner

R. SKUDY, Assistant Examiner

U.S. Cl. X.R.

310—83, 266